(12) United States Patent
Nonoyama et al.

(10) Patent No.: US 10,840,534 B2
(45) Date of Patent: Nov. 17, 2020

(54) FUEL CELL WITH DISCHARGE PIPE

(71) Applicant: TOYOTA JIDOSHA KABUSHIKI KAISHA, Toyota (JP)

(72) Inventors: Nobuaki Nonoyama, Chiryu (JP); Masaya Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 15/876,956

(22) Filed: Jan. 22, 2018

(65) Prior Publication Data
US 2018/0241069 A1 Aug. 23, 2018

(30) Foreign Application Priority Data
Feb. 17, 2017 (JP) .................. 2017-027740

(51) Int. Cl.
*H01M 8/2484* (2016.01)
*H01M 8/04223* (2016.01)
*H01M 8/0432* (2016.01)

(52) U.S. Cl.
CPC ..... *H01M 8/2484* (2016.02); *H01M 8/04231* (2013.01); *H01M 8/04358* (2013.01)

(58) Field of Classification Search
CPC ............. H01M 8/0247; H01M 8/0267; H01M 8/04029; H01M 8/04156; H01M 8/04291; H01M 8/2415; H01M 8/2483; H01M 8/2484
See application file for complete search history.

(56) References Cited

U.S. PATENT DOCUMENTS

| | | | | |
|---|---|---|---|---|
| 4,407,904 | A | * 10/1983 | Uozumi | H01M 8/0258 429/437 |
| 4,574,112 | A | * 3/1986 | Breault | F28D 7/0041 429/434 |
| 6,416,899 | B1 | * 7/2002 | Wariishi | H01M 8/2483 429/446 |
| 6,936,369 | B1 | 8/2005 | Komura et al. | |
| 2004/0142226 | A1 | * 7/2004 | Yamauchi | H01M 8/0258 429/437 |
| 2004/0247986 | A1 | * 12/2004 | Takeguchi | H01M 8/0263 429/457 |
| 2005/0255366 | A1 | * 11/2005 | Tighe | H01M 8/241 429/447 |
| 2005/0271910 | A1 | * 12/2005 | Bai | H01M 8/0258 429/458 |

(Continued)

FOREIGN PATENT DOCUMENTS

| JP | 2001118596 A | 4/2001 |
|---|---|---|
| JP | 2001266925 A | 9/2001 |

(Continued)

*Primary Examiner* — Imran Akram
(74) *Attorney, Agent, or Firm* — Dickinson Wright PLLC

(57) ABSTRACT

The fuel cell FC includes a discharge manifold AMe for discharging anode offgas from inside the fuel cell to outside the fuel cell. In the discharge manifold AMe, discharge pipe 45 is placed, and a support mechanism 400 is provided, the support mechanism including one or plural supporting portions 41 for supporting the discharge pipe 45 as well as an engaging portion 43 for placing a distal end portion 45a of the discharge pipe 45 at a position apart from a closed end E2 of the discharge manifold AMe.

8 Claims, 11 Drawing Sheets

(56) References Cited

U.S. PATENT DOCUMENTS

| | | | |
|---|---|---|---|
| 2009/0017355 A1* | 1/2009 | Kawabata | H01M 8/0258 429/483 |
| 2011/0033780 A1* | 2/2011 | Jang | H01M 4/905 429/508 |
| 2014/0134510 A1* | 5/2014 | Kawabata | H01M 8/242 429/437 |
| 2016/0141704 A1* | 5/2016 | Kim | H01M 8/2484 429/459 |

FOREIGN PATENT DOCUMENTS

| | | | |
|---|---|---|---|
| JP | 2011165395 A | 8/2011 |
| JP | 2014067689 A | 4/2014 |
| JP | 2017033695 A | 2/2017 |

\* cited by examiner

FUEL CELL WITH DISCHARGE PIPE

CROSS REFERENCE TO OTHER APPLICATIONS

The present application claims priority from Japanese patent application (application number 2017-027740) entitled "FUEL CELL" filed on Feb. 17, 2017, the entirety of the disclosure of which is hereby incorporated by reference into this application.

TECHNICAL FIELD

The present disclosure relates to a fuel cell.

BACKGROUND ART

To discharge water, which is residing on the deeper side of the outlet-side fuel-gas communicating holes and outlet-side oxidizing-gas communicating holes in a fuel cell, outside the fuel cell a technique of laying out a drain pipe via a stay plate within outlet-side fuel-gas communicating holes has been proposed. A communicating path formed by stacking the outlet-side fuel-gas communicating holes and the outlet-side oxidizing-gas communicating holes is also referred to as manifold, commonly.

In the related art, however, the case that an end of the drain pipe on the deeper side of the outlet-side fuel-gas communicating holes is closed by a resin cap to ensure its insulation property. Further, even in cases where the end of the drain pipe is not closed by a resin cap, the end of the drain pipe may be closed by a terminal plate or an insulator plate positioned on the deeper side of the outlet-side fuel-gas communicating holes, therefore the residing water may not be drained. Another problem that flow path area of the outlet-side fuel-gas communicating holes is reduced by the stay plate exists. In addition, similar problems are involved also in discharge of residing gas within the coolant manifold serving for communication of the coolant.

Accordingly, in fuel cells field, it has been desired that laying out a discharge pipe within the discharge manifold so as to prevent any hindrance to the discharge of residing water or residing gas, as well as that laying out a discharge pipe so as to suppress reduction of the flow path area of the discharge manifold.

The present disclosure, having been accomplished to solve the above-described problems, may be embodied in the following aspects.

SUMMARY

In a first aspect, a fuel cell is provided. The fuel cell according to the first aspect includes: a discharge manifold configured to discharge reaction offgas or coolant from inside of the fuel cell to outside of the fuel cell, the discharge manifold having an open end and a closed end; discharge pipe placed within the discharge manifold, the discharge pipe having a first end portion located on one side closer to the open end and a second end portion located on another side closer to the closed end; and a support mechanism configured to support the discharge pipe within the discharge manifold, the support mechanism including one or plural supporting portions configured to support the discharge pipe and an engaging portion configured to place the second end portion at a position apart from the closed end of the discharge manifold.

According to the fuel cell of the first aspect, since the support mechanism configured to support the discharge pipe within the discharge manifold includes the one or plural supporting portions for supporting the discharge pipe, and the engaging portion configured to place the second end portion of the discharge pipe at a position apart from the closed end of the discharge manifold, it is implementable to lay out the discharge pipe within the discharge manifold so as to prevent any hindrance to discharge of residing water or residing gas, as well as to lay out the discharge pipe so as to suppress any reduction of the flow path area of the discharge manifold.

In the fuel cell of the first aspect, the support mechanism may further include a retaining portion configured to retain the discharge pipe. In this case, it is implementable to suppress or prevent placement of the discharge pipe.

In the fuel cell of the first aspect, the discharge manifold may be a gas discharge manifold configured to discharge the reaction offgas, and the discharge pipe and the support mechanism may be provided so as to be located at a vertically lower side in the discharge manifold when the fuel cell is mounted in position. In this case, residing water in the gas discharge manifold can be discharged smoothly outside the fuel cell.

In the fuel cell of the first aspect, the discharge manifold may be a liquid discharge manifold configured to discharge the coolant, and the discharge pipe and the support mechanism may be provided so as to be located at a vertically upper side in the discharge manifold when the fuel cell is mounted in position. In this case, residing gas in the liquid discharge manifold can be discharged smoothly outside the fuel cell.

In the fuel cell of the first aspect, the retaining portion may be placed on one side closer to the open end while the supporting portion may be placed between the retaining portion and the engaging portion. By the retaining portion being placed on the open end side, insertion of the discharge pipe into the support mechanism can be facilitated.

In the fuel cell of the first aspect, the fuel cell may be formed by stacking a plurality of unit cells, each of the unit cells including a pair of separators and a frame placed between the pair of separators and retaining an electrolyte membrane, the pair of separators and the frame may be provided with discharge manifold formation ports, respectively, to form the discharge manifold at stacked condition, and the support mechanism may be formed at the discharge manifold formation port that the frame has. Since residing water or residing gas in the discharge manifold is discharged smoothly, flowability of the reactant gas or the coolant in the fuel cell can be improved.

In the fuel cell of the first aspect, the support mechanism may be further formed in at least one of the discharge manifold formation ports provided in the pair of separators. In this case, rigidity of the support mechanism can be improved.

DESCRIPTION OF EMBODIMENTS

Hereinbelow, a fuel cell according to the present disclosure will be described with reference to the accompanying drawings.

First Embodiment

Figure 1:
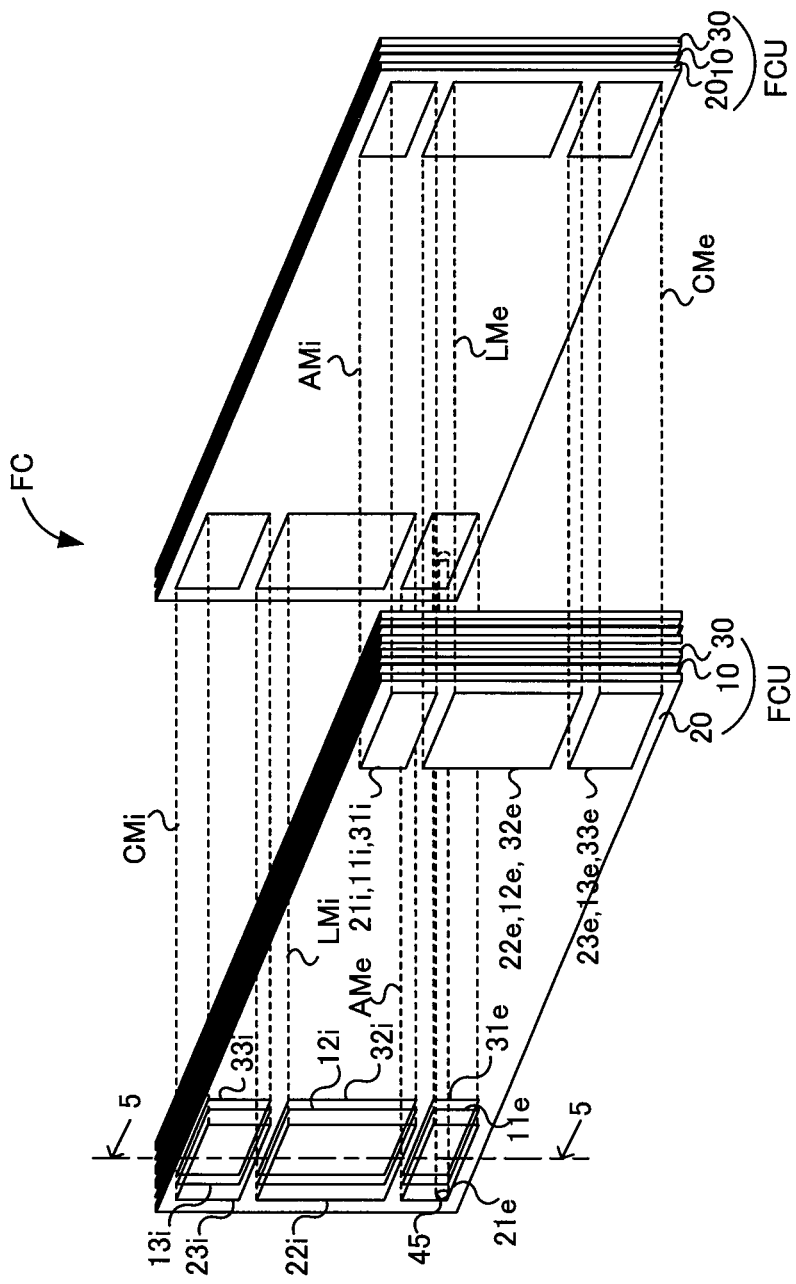
FIG. 1 is an explanatory view schematically showing an overall configuration of a fuel cell according to a first embodiment.
Figure 2:
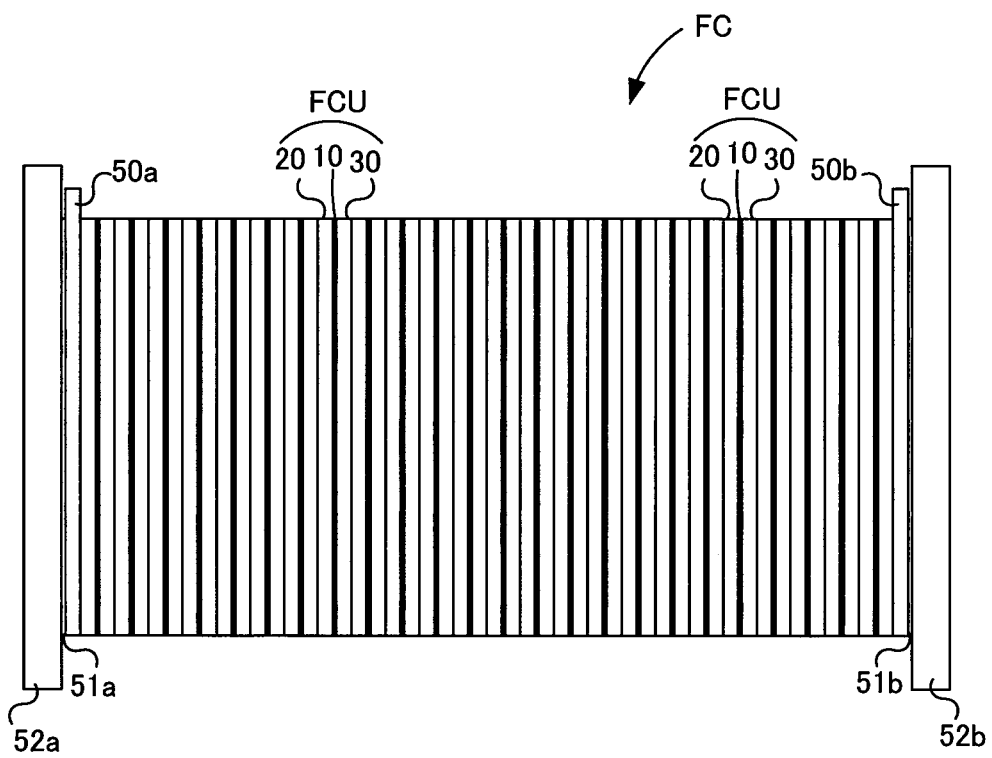
FIG. 2 is an explanatory view schematically showing a side face of the fuel cell according to the first embodiment.

FIG. 1 is an explanatory view schematically showing an overall configuration of a fuel cell according to a first embodiment. FIG. 2 is an explanatory view schematically showing a side face of the fuel cell according to the first embodiment.

The fuel cell FC according to the first embodiment, as shown in FIG. 2, includes a frame 10, an anode separator 20, a cathode separator 30, a first terminal plate 50*a*, and a second terminal plate 50*b*. The frame 10, the anode separator 20, and the cathode separator 30 form a unit fuel cell FCU. The first terminal plate 50*a* and the second terminal plate 50*b*, a first insulating plate 51*a* and a second insulating plate 51*b*, as well as a first end plate 52*a* and a second end plate 52*b* are placed at both end portions, respectively, of a stacked body in which a plurality of unit fuel cells FCU are stacked, thus a fuel cell FC being configured. In addition, the unit fuel cell FCU may also be referred to as 'cell,' 'unit cell,' or simply, 'fuel cell' while the fuel cell FC formed by stacking of the unit fuel cells FCU or cells may be referred to also as a 'fuel cell stack.' The anode separator 20 and the cathode separator 30 may be referred to generically as a pair of separators. The fuel cell FC may be mounted on a mobile body such as vehicles or ships, or may be fixedly set as a power source for a facility.

In the frame 10, the anode separator 20 and the cathode separator 30, anode gas supply ports 11*i*, 21*i*, 31*i*, anode offgas discharge ports 11*e*, 21*e*, 31*e*, coolant supply ports 12*i*, 22*i*, 32*i*, coolant discharge ports 12*e*, 22*e*, 32*e*, cathode gas supply ports 13*i*, 23*i*, 33*i*, and cathode offgas discharge ports 13*e*, 23*e*, 33*e* are formed respectively. For simplicity's sake, in FIG. 1, the anode gas supply port 21*i* in the anode separator 20 is typically shown while the anode gas supply ports in the frame 10 and the cathode separator 30 are omitted in depiction with their signs 11*i*, 31*i* added. Similarly, the coolant discharge ports 12*e*, 32*e* and the cathode offgas discharge ports 13*e*, 33*e* are omitted in depiction with their signs added to those of the coolant discharge port 22*e* and the cathode offgas discharge port 23*e*, respectively.

By the arrangement that the frame 10, the anode separator 20 and the cathode separator 30 are stacked together, the anode gas supply ports 11*i*, 21*i*, 31*i* form an anode gas supply manifold AMi while the anode offgas discharge ports 11*e*, 21*e*, 31*e* form an anode offgas discharge manifold AMe.

At the anode offgas discharge manifold AMe, discharge pipe 45 for facilitating discharge of residing water is placed. The coolant supply ports 12*i*, 22*i*, 32*i* form a coolant supply manifold LMi, and the coolant discharge ports 12*e*, 22*e*, 32*e* form a coolant discharge manifold LMe. The coolant discharge manifold LMe may be referred to also as liquid discharge manifold. The cathode gas supply ports 13*i*, 23*i*, 33*i* form a cathode gas supply manifold CMi, and the cathode offgas discharge ports 13*e*, 23*e*, 33*e* form a cathode offgas discharge manifold CMe. The anode offgas discharge ports 11*e*, 21*e*, 31*e*, the cathode offgas discharge ports 13*e*, 23*e*, 33*e*, and the coolant discharge ports 12*e*, 22*e*, 32*e* may be referred to as discharge manifold formation ports.

Fuel gas supplied to the fuel cell FC flows from the anode gas supply manifold AMi via an unshown fuel gas internal flow path to the anode offgas discharge manifold AMe so as to be discharged from the fuel cell FC as fuel offgas. Similarly, coolant supplied to the fuel cell FC flows from the coolant supply manifold LMi via an unshown coolant internal flow path to the coolant discharge manifold LMe so as to be discharged from the fuel cell FC. Similarly, oxidizing gas supplied to the fuel cell FC flows from the cathode gas supply manifold CMi via an unshown oxidizing gas internal flow path to the cathode offgas discharge manifold CMe so as to be discharged outside the fuel cell FC as oxidizing offgas. It is noted that fuel gas and oxidizing gas, which are both reactant gases to be used for electrochemical reactions, may be referred to as reactant gas without distinguishing between the two kinds of gases, and the reactant gas after lending those gases to electrochemical reactions may be referred to as reaction offgas. Hydrogen gas may be used as the fuel gas, and air may be used as the oxidizing gas.

The first and second terminal plates 50*a*, 50*b* are metallic plate-shaped members which function as output electrodes for extracting electric power generated by electrochemical reactions in the fuel cell FC. The first and second insulating plates 51*a*, 51*b* are plate-shaped members made from non-conductive material, such as resin or rubber, for electrically insulating the first and second end plates 52*a*, 52*b* and the first and second terminal plates 50*a*, 50*b* from each other, respectively. The first and second terminal plates 50*a*, 50*b* are plate-shaped members made from metal or high-strength resin to be used as base plates for fixing the fuel cell FC in its stacked state, where in order to impart the high strength, those plate-shaped members are thicker in plate thickness than the other plate-shaped members constituting the fuel cell FC. Tightening the first and second terminal plates 50*a*, 50*b* by using tightening tools exemplified by unshown bolts and nuts allows the fuel cell FC to be fixed in the stacked state.

Figure 3:
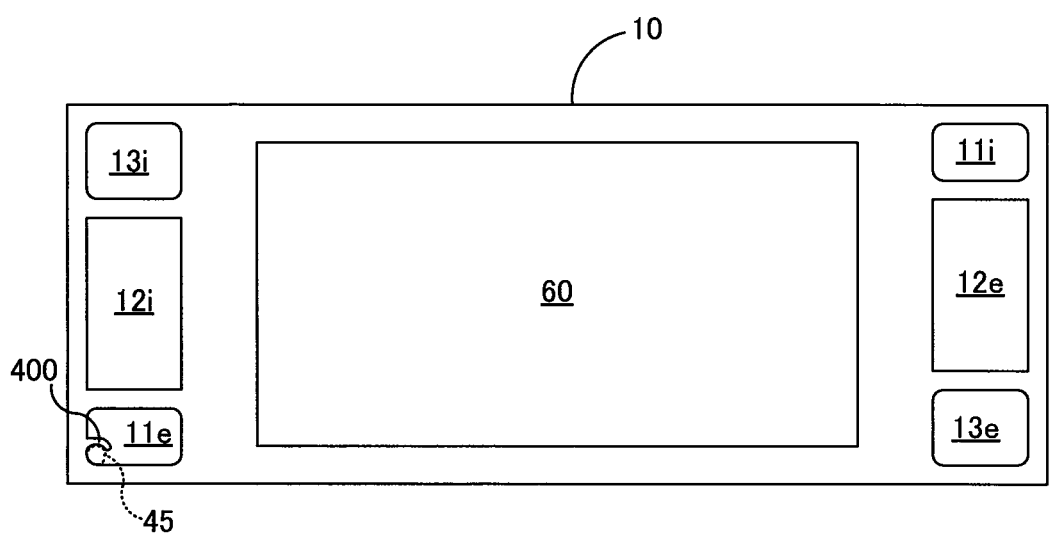
FIG. 3 is an explanatory view showing a frame to be used in the fuel cell according to the first embodiment.

FIG. 3 is an explanatory view showing a frame to be used in the fuel cell according to the first embodiment. The frame 10, which needs only to have insulating property, is a plate-shaped member or film-shaped member having a three-layer structure in which adhesive layers are formed on both sides of a base material made from, e.g., resin or glass. An opening is formed in a center of the frame 10, and an electrolyte membrane 60 is placed at the opening. The electrolyte membrane may be, for example, a membrane electrode assembly in which catalyst layers are formed on both sides of a solid polymer electrolyte membrane.

The frame 10 has a plurality of openings at both longitudinal end portions, respectively. The plurality of openings include a frame anode-gas supply port 11*i*, a frame anode-offgas discharge port 11*e*, a frame coolant supply port 12*i*, a frame coolant discharge port 12*e*, a frame cathode-gas supply port 13*i*, and a frame cathode-offgas discharge port 13e. The discharge pipe 45 is inserted and placed at the frame anode-offgas discharge port 11e when the unit fuel cells FCU are stacked together to configure the fuel cell FC. Vertically under the frame anode-offgas discharge port 11e, a support mechanism 400 is formed to support, engage, or retain the discharge pipe 45. Details of the support mechanism 400 will be described later. Since an object to be discharged by the discharge pipe 45 is liquid, i.e. water, which tends to accumulate at the anode offgas discharge manifold AMe due to gravity, the support mechanism 400 is formed on the vertically lower side in terms of discharge efficiency. It is noted that the vertical direction refers to a vertical direction when the fuel cell FC is mounted or placed on a mounting object body.

Figure 4:
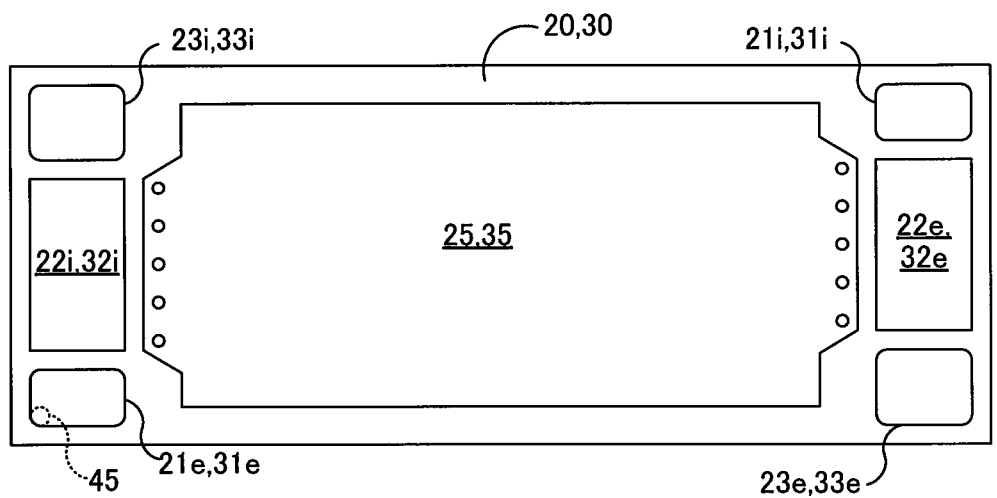
FIG. 4 is an explanatory view showing separators to be used in the fuel cell according to the first embodiment.

FIG. 4 is an explanatory view showing separators to be used in the fuel cell according to the first embodiment. The separators, as already described, include the anode separator 20 and the cathode separator 30. Although the anode separator 20 and the cathode separator 30 may have different structural elements in detailed structure from each other, yet those different structural elements do not affect this embodiment and therefore the anode separator 20 and the cathode separator 30 will be described by designating them as separators generically. The separators 20, 30 are, for example, plate-shaped members made from metal material such as stainless steel, titanium or titanium alloy, or from carbon material. On one side of the separators 20, 30, coolant internal flow paths 25, 35 are formed to lead the coolant to inside the fuel cell. The coolant internal flow paths 25, 35 need only to be formed in at least either one of the separators 20, 30. On the unshown other side of the anode separator 20, a fuel gas internal flow path is formed to lead the fuel gas to inside the fuel cell. On the unshown other side of the cathode separator 30, an oxidizing gas internal flow path is formed to lead the oxidizing gas to inside the fuel cell. The anode-separator anode gas supply port 21i is communicated with the anode-separator anode offgas discharge port 21e via the fuel gas internal flow path, while the cathode-separator cathode gas supply port 33i is communicated with the cathode-separator cathode offgas discharge port 33e via the oxidizing gas internal flow path.

Each separator 20, 30 has a plurality of openings at its longitudinal both end portions, respectively. The plurality of openings provided in the anode separator 20 include the anode-separator anode gas supply port 21i, the anode-separator anode offgas discharge port 21e, the anode-separator coolant supply port 22i, the anode-separator coolant discharge port 22e, the anode-separator cathode gas supply port 23i, and the anode-separator cathode offgas discharge port 23e. The plurality of openings provided in the cathode separator 30 include the cathode-separator anode gas supply port 31i, the cathode-separator anode offgas discharge port 31e, the cathode-separator coolant supply port 32i, the cathode-separator coolant discharge port 32e, the cathode-separator cathode gas supply port 33i, and the cathode-separator cathode offgas discharge port 33e. The anode-separator coolant supply port 22i and the anode-separator coolant discharge port 22e are communicated with each other via the coolant internal flow path 25, while the cathode-separator coolant supply port 32i and the cathode-separator coolant discharge port 32e are communicated with each other via the coolant internal flow path 35. At each of the respective-separator anode offgas discharge ports 21e, 31e, the discharge pipe 45 is inserted and placed when the unit fuel cells FCU are stacked together to configure the fuel cell FC.

The anode separator 20 is laid on one side of the frame 10, and the cathode separator 30 is laid on the other side of the frame 10, by which each unit fuel cell FCU is formed. In addition, since an adhesive layer is formed on both front and back sides of the frame, the frame 10 and the anode separator and cathode separator 20, 30 are set into close contact with each other, respectively, providing a sealing performance against the reactant gas and the coolant.

Figure 5:
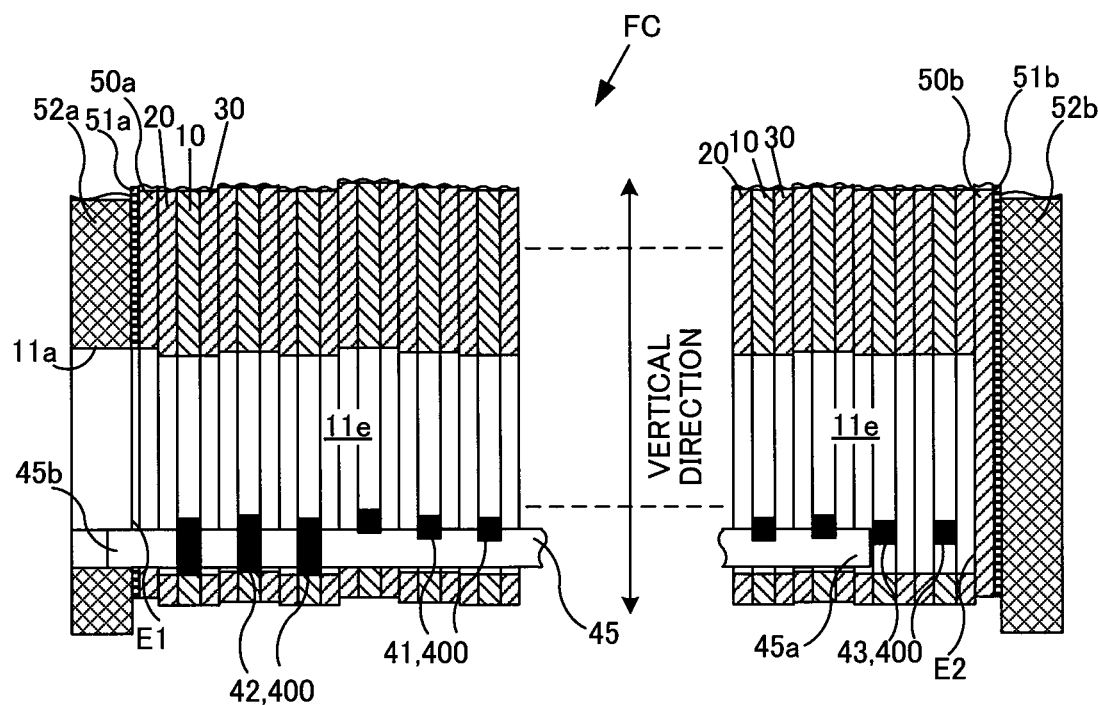
FIG. 5 is a longitudinal sectional view of an anode offgas manifold in the fuel cell according to the first embodiment.

FIG. 5 is a longitudinal sectional view of the anode offgas discharge manifold in the fuel cell according to the first embodiment. FIG. 5 is a longitudinal sectional view around the anode offgas discharge manifold AMe resulting from cutting the fuel cell FC longitudinally by line 5-5 shown in FIG. 1. The anode offgas discharge manifold AMe has an open end E1 and a closed end E2, and anode offgas flows from the closed end E2 toward the open end E1. In FIG. 5, for an easier explanation of the support mechanism 400, relative sizes of the frame 10, the anode separator 20 and the cathode separator 30 are different from their actual sizes, whereas the anode separator 20 and the cathode separator 30 are in many cases larger in thickness than the frame 10.

In the first embodiment, the support mechanism 400 formed at the anode offgas discharge port 11e includes a supporting portion 41, a retaining portion 42 and an engaging portion 43. One or plural frames 10 having the retaining portion 42 are placed on the open end E1 side of the anode offgas discharge manifold AMe, while one or plural frames 10 having the engaging portion 43 are placed on its closed end E2 side. Between the open end E1 side and the closed end E2 side of the anode offgas discharge manifold AMe, are placed one or plural frames 10 including the supporting portion 41. Over the range from the open end E1 to the closed end E2 of the anode offgas discharge manifold AMe, is placed the discharge pipe 45 for discharging water residing at the anode offgas discharge port 11e. The discharge pipe 45 has a base end portion 45b as a first end portion located on the open end E1 side and a distal end portion 45a as a second end portion located on the closed end E2 side. The discharge pipe 45 may be, for example, any one of resin pipe, rubber pipe and glass pipe. In addition, the discharge pipe 45 is desirably formed from a material having flexibility such as resin and rubber material in order to avoid its damage due to vibrations, temperature variations or the like during use of the fuel cell FC. The support mechanism 400 supports the discharge pipe 45 in a specified position over the range from the open end E1 to the closed end E2 of the anode offgas discharge manifold AMe.

Figure 6:
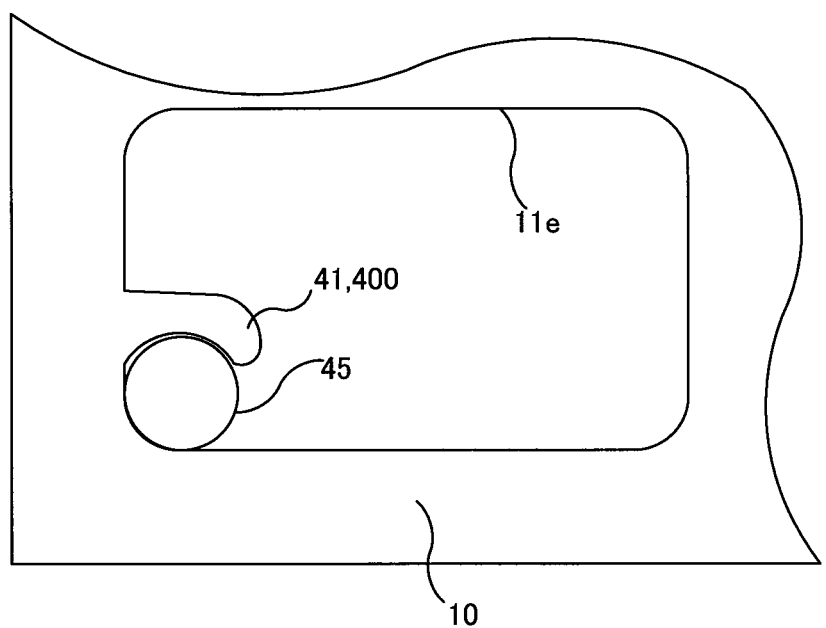
FIG. 6 is an enlarged view of the anode offgas manifold of a frame in which a supporting portion is formed.

FIG. 6 is an enlarged view of the anode offgas discharge manifold of a frame in which the supporting portion is formed. The supporting portion 41, as seen in a plan view of the frame 10, has such an approximately C-like shape as to include a through hole through which the discharge pipe 45 extends and an opening portion opened toward a center of the anode offgas discharge manifold AMe. The supporting portion 41 needs only to support the discharge pipe 45 at least in a predetermined position. Upon contact with the distal end portion 45a of the discharge pipe 45 during the insertion of the discharge pipe 45, the supporting portion 41, by virtue of having an approximately C-like shape having an opening portion, is deformed so as to reduce interference with the discharge pipe 45, facilitating the insertion of the discharge pipe 45. In addition, the supporting portion 41 is not limited to the approximately C-like shape, and needs only to be so shaped as to have an opening portion opened toward the center of the anode offgas discharge manifold AMe on the vertically lower side of the anode offgas discharge port 11e as well as to be in contact with the discharge pipe 45 and enabled to support the discharge pipe 45 in a specified position. For example, the supporting portion 41 may be an I- or L-like protruding portion which protrudes from a side face of the anode offgas discharge port 11e toward the vertically lower side.

Figure 7:
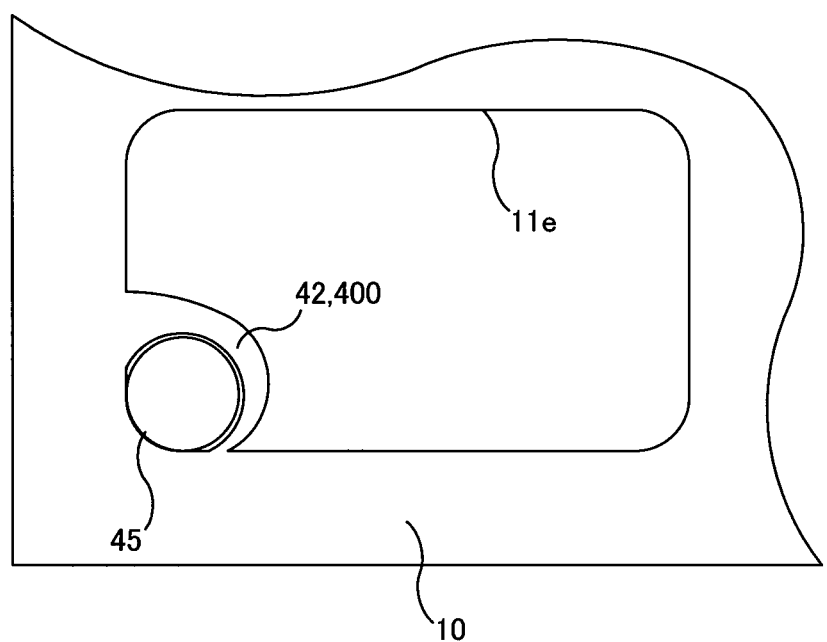
FIG. 7 is an enlarged view of the anode offgas manifold of a frame in which a retaining portion is formed.

FIG. 7 is an enlarged view of the anode offgas discharge manifold of a frame in which a retaining portion is formed. The retaining portion 42, as seen in a plan view of the frame 10, has an approximately O-like shape including a through hole through which the discharge pipe 45 extends. The retaining portion 42, having no opening portion for preventing the discharge pipe 45 from coming out of the through hole, retains the discharge pipe 45 in a specified position. The provision of the retaining portion 42 makes it possible to prevent the discharge pipe 45 from displacement due to vibrations as well as longitudinal acceleration and lateral acceleration during operation of the fuel cell FC. In addition, the retaining portion 42, also functioning as a guide portion for guiding the discharge pipe 45 during insertion of the discharge pipe 45 into the support mechanism 400, is desirably placed on one side of the fuel cell FC closer to the open end E1 where the insertion of the discharge pipe 45 is started. Further, when the retaining portion 42 is provided over an entire length of the anode offgas discharge manifold AMe, there may occur interference with the distal end portion 45a during the insertion of the discharge pipe 45, causing a possibility of decrease in the insertion work efficiency. Therefore, the retaining portion 42 is desirably provided over part of the anode offgas discharge manifold AMe.

Figure 8:
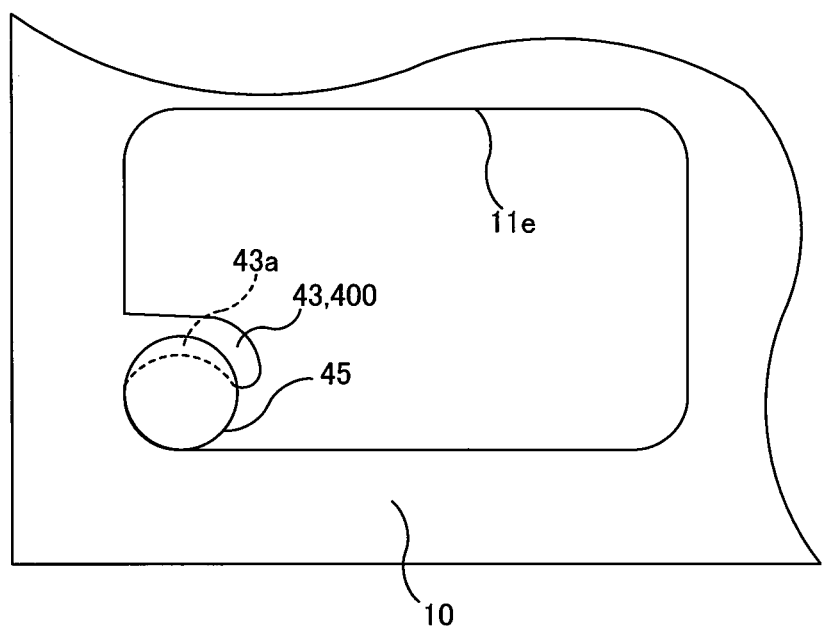
FIG. 8 is an enlarged view of the anode offgas manifold of a frame in which an engaging portion is formed.

FIG. 8 is an enlarged view of the anode offgas discharge manifold of a frame in which an engaging portion is formed. The engaging portion 43, as seen in a plan view of the frame 10, has such an approximately C-like shape as to include an opening portion opened toward the center of the anode offgas discharge manifold AMe. The engaging portion 43 also has a contact portion 43a which is to be put into contact with part of a distal end face of the discharge pipe 45, i.e., part of an end face portion of the distal end portion 45a of the discharge pipe 45. In addition, the engaging portion 43 may be formed identical in shape to the supporting portion 41 and provided in offset placement so as to be in contact with part of the end face portion of the distal end portion 45a of the discharge pipe 45. By the placement of the engaging portion 43 involving contact with the end face portion of the distal end portion 45a of the discharge pipe 45 or engagement with the end face portion of the distal end portion 45a, the engaging portion 43 is enabled to regulate the position of the distal end portion 45a of the discharge pipe 45 to a desired position. More specifically, the engaging portion 43 is formed in frames 10 adjacent or close to the terminal plate 50b, so that mutual contact between the distal end portion 45a of the discharge pipe 45 and the terminal plate 50b is prevented and therefore sealing or partial sealing of the distal end face of the discharge pipe 45 by the terminal plate 50b can be avoided. As a result, it becomes possible to prevent any hindrance to discharge of water present on the closed end E2 side of the anode offgas discharge manifold AMe. In addition, since the discharge pipe 45 is tubular-shaped, its end face portion has an annular surface. The engaging portion 43 may also be formed into such an approximately O-like shape as to include an opening portion which is coaxial with the discharge pipe 45 in terms of their center axes. The engaging portion 43 may have either an annular shape smaller than an outer-diameter size of the discharge pipe 45 and larger than its inner-diameter size or such a plate shape as to include an opening portion smaller than the inner-diameter size of the discharge pipe 45. In this case, the engaging portion 43, even though it is not provided in offset placement, is enabled to engage with the distal end portion 45a of the discharge pipe 45.

Figure 9:
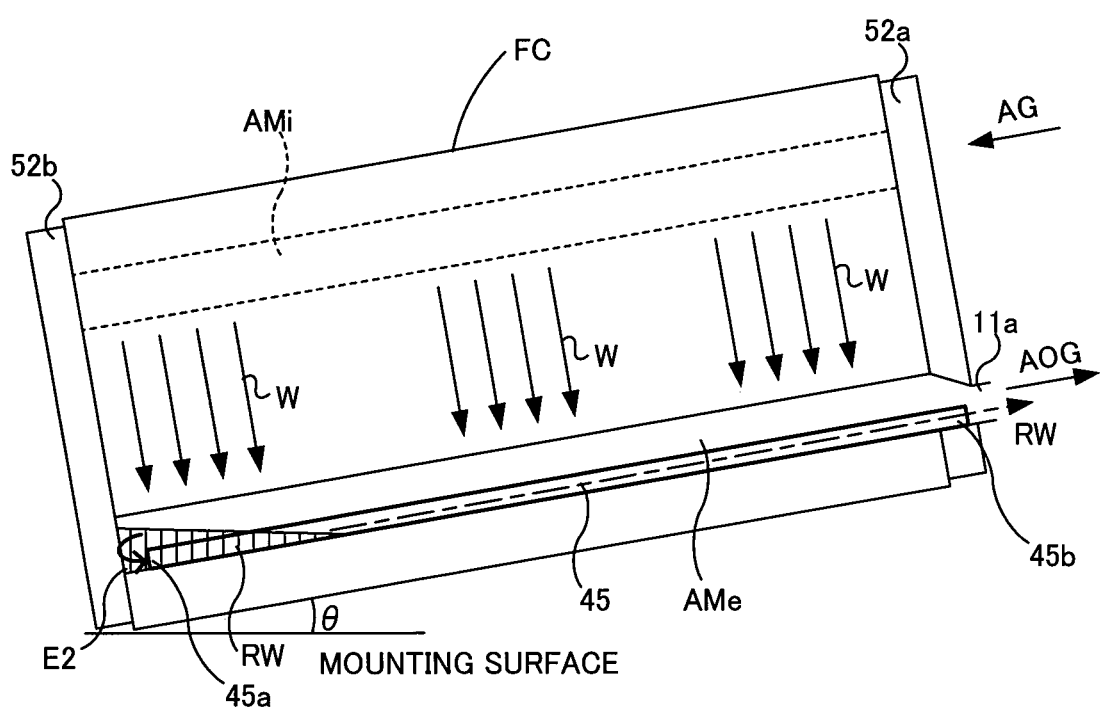
FIG. 9 is an explanatory view showing functional effects of discharge pipe and a support mechanism in the fuel cell according to the first embodiment.

FIG. 9 is an explanatory view showing functional effects of the discharge pipe and the support mechanism in the fuel cell according to the first embodiment. Fuel gas AG is introduced to the anode gas supply manifold AMi, and water W generated by electrochemical reactions anode gas and oxidizing gas is flowed to the anode offgas discharge manifold AMe by gravity as well as the flow of the fuel gas in the fuel gas internal flow path. In a case where the fuel cell FC is in such an inclined mounting posture as to form an angle θ against the mounting surface as shown in FIG. 9, residing water RW is more likely to be generated particularly on the closed end E2 side. In the fuel cell FC according to the first embodiment, since the distal end portion 45a of the discharge pipe 45 is retained apart from the closed end E2 by the support mechanism 400, the residing water RW is more likely taken into the discharge pipe 45, so that the residing water RW to be discharged from the base end portion 45b of the discharge pipe 45 is discharged to outside the fuel cell FC along with fuel offgas AOG from a discharge port 11a of the anode offgas discharge manifold AMe. In the example shown in FIG. 9, the first end plate 52a has an opening portion that decreases in cross-sectional area of the anode offgas discharge manifold AMe more and more toward the discharge port 11a. As a result of this, by Venturi effect, flow velocity of the fuel offgas AOG is increased, pressure at the discharge port 11a is decreased, pressure difference between the closed end E2 and the discharge port 11a is increased, and residing water RW is discharged from the discharge pipe 45.

As described above, in the fuel cell FC according to the first embodiment, frames 10 placed on the closed end E2 side of the anode offgas discharge manifold AMe have, at the anode offgas discharge port 11e, the engaging portion 43 that is one member of the support mechanism 400. In a conventional mode with no engaging portion 43 provided, it is not easy to place an end of the discharge pipe 45, which is to be placed by insertion, accurately to a specified position, and moreover the distal end position of the discharge pipe 45 may be displaced by, e.g., vibrations originating from a vehicle as the object on which the fuel cell FC is to be mounted. In contrast to this, with the engaging portion 43 provided, the distal end portion 45a of the discharge pipe 45 is to be set into contact and engagement with the engaging portion 43, so that the distal end portion 45a of the discharge pipe 45 can be engaged at a desired position apart from the closed end E2 of the anode offgas discharge manifold AMe. Accordingly, such problems can be solved as one that, no matter whether the discharge pipe 45 is under insertion or the fuel cell FC is under operation, entirety or part of the distal end portion 45a of the discharge pipe 45 may be blocked at the closed end E2, i.e., entirety of the distal end portion 45a may be brought into contact and blockage with the terminal plate 50b so that the intake of residing water into the discharge pipe 45 is no longer fulfilled, or part of the distal end portion 45a may be clogged so that the intake of residing water RW into the discharge pipe 45 is less easily fulfilled. Smoothly fulfilling the discharge of the residing water RW leads to a solution to the problem of decrease in the flow path cross-sectional area of the anode offgas discharge manifold AMe due to the residing water RW, making it possible to implement smooth flows of fuel gas and fuel offgas inside the fuel cell FC. As a result of this, power generation efficiency in the fuel cell FC can be improved.

Depending on the mounting posture of the fuel cell FC, residing water RW is more likely to be accumulated particularly at the closed end E2 of the anode offgas discharge manifold AMe. However, even in such a mounting posture, according to the fuel cell FC of the first embodiment, the residing water RW can be smoothly brought into the discharge pipe 45 and discharged outside the fuel cell FC.

Since the support mechanism 400 in the first embodiment is formed at the anode offgas discharge port 11e in the frame 10, the work of placing the support mechanism, which is an independent member, at the anode offgas discharge manifold AMe is no longer necessary, and moreover the support mechanism may be reduced in size, compared with the case in which the independent support mechanism is placed. As a consequence of this, it becomes possible to reduce the exclusive area of the support mechanism occupying in the flow-path cross-sectional area of the anode offgas discharge manifold AMe, so that hindrance to the discharge of the anode offgas can be suppressed or prevented.

Second Embodiment

Figure 10:
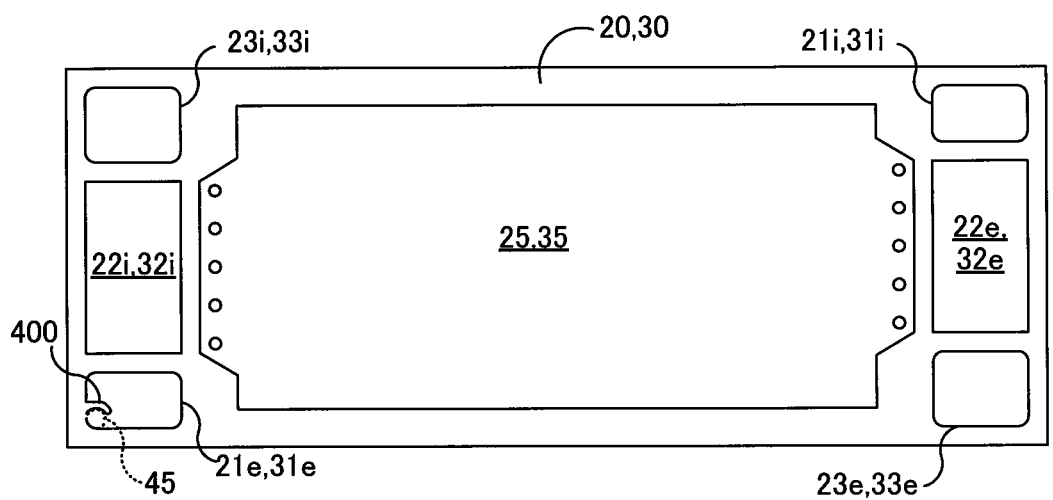
FIG. 10 is an explanatory view showing separators to be used in a fuel cell according to a second embodiment.

FIG. 10 is an explanatory view showing separators to be used in a fuel cell according to a second embodiment. In the first embodiment, the support mechanism 400 is formed only in the frame 10. In the second embodiment, the support mechanism 400 is formed not only in the frame 10 but also in at least either one of the anode separator 20 and the cathode separator 30. Except that at least either one of the anode separator 20 and the cathode separator 30 has the support mechanism 400, the fuel cell FC according to the second embodiment is similar in configuration to the fuel cell FC according to the first embodiment, and so its depiction is omitted. The support mechanism 400 to be formed in at least either one of the anode separator 20 and the cathode separator 30 may be any arbitrary combination of the supporting portion 41, the retaining portion 42 and the engaging portion 43. In addition, desirably, the engaging portion 43 is formed in at least either one of the anode separator 20 and the cathode separator 30, whichever it is to be integrated with the frame 10 including the engaging portion 43.

With use of the fuel cell according to the second embodiment, since the support mechanism 400 is formed in at least either one of the metallic anode separator 20 and cathode separator 30, the supporting portion 41, the retaining portion 42 and the engaging portion 43 can be improved in rigidity, as compared with cases in which the supporting portion 41, the retaining portion 42 and the engaging portion 43 are formed only in the resin-made frame 10. In addition, the support mechanism 400 may be not provided in the frame 10 but provided in at least either one of the anode separator 20 and the cathode separator 30.

Third Embodiment

Figure 11:
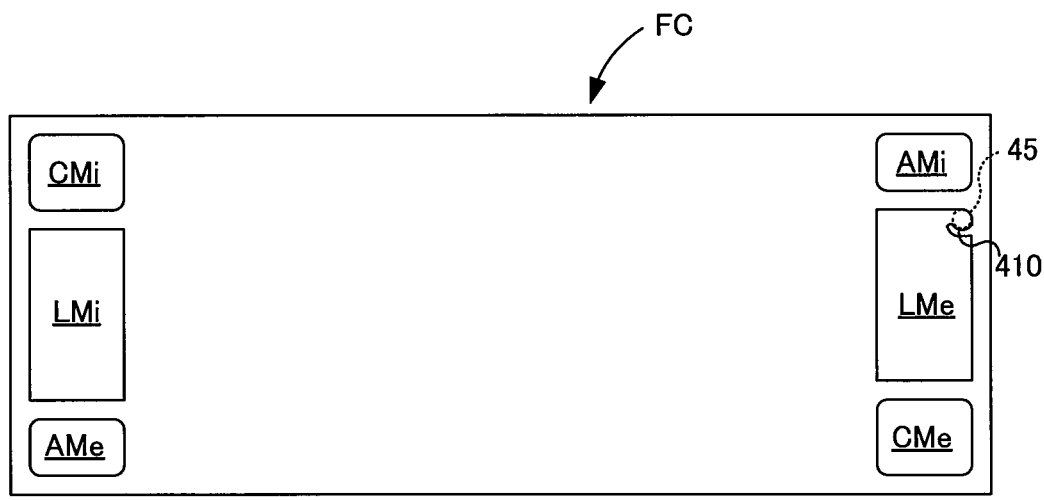
FIG. 11 is an explanatory view showing individual manifolds in a fuel cell according to a third embodiment.

FIG. 11 is an explanatory view showing individual manifolds in a fuel cell according to a third embodiment. In the fuel cell FC according to the third embodiment, a support mechanism 410 is provided at the coolant discharge manifold LMe. According to the third embodiment, it is implementable to fulfill a smooth discharge of residing gas contained in the coolant, so that the cooling efficiency of the fuel cell FC can be improved. In the case where the support mechanism 410 is provided at the coolant discharge manifold LMe, since the object of discharge is gaseous matter, the support mechanism 410 is placed on a vertically upper side of the coolant discharge manifold LMe. In addition, in addition to the support mechanism 400 provided at the anode offgas discharge manifold AMe and the cathode offgas discharge manifold CMe, the support mechanism 410 may also be provided at the coolant discharge manifold LMe.

MODIFICATIONS (1) First Modification

The support mechanism 400 includes the retaining portion 42 in the first and second embodiments. However, the support mechanism 400 may include no retaining portion 42. In a case where the outer-diameter size of the discharge pipe 45 is larger than the opening size of the supporting portion 41, the discharge pipe 45 can be retained in its placement position by the supporting portion 41. Also, a recessed portion for supporting the distal end portion 45a of the discharge pipe 45 may be formed in the engaging portion 43, in which case the engaging portion 43 fulfills the function of the supporting portion 41. In this case, the supporting portion 41 does not need to be provided.

(2) Second Modification

The first and second embodiments have been described in modes in which the support mechanism 400 is provided at the anode offgas discharge manifold AMe. The support mechanism may be provided also at the cathode offgas discharge manifold CMe instead of the anode offgas discharge manifold AMe or in addition to the anode offgas discharge manifold AMe. In this case, it becomes implementable to accelerate the discharge of residing water at the cathode offgas discharge manifold CMe, so that the power generation efficiency of the fuel cell FC can be improved.

(3) Third Modification

Positions of the supporting portion 41, the retaining portion 42 and the engaging portion 43 in the first and second embodiments are not limited to the above-described positions but may also be other ones. For example, the retaining portion 42 may be placed not only on the open end E1 side but also at an intermediate position of the anode offgas discharge manifold AMe. Even in this case, the discharge pipe 45 can be retained at the anode offgas discharge manifold AMe, and displacement of the discharge pipe 45 in the intermediate position of the anode offgas discharge manifold AMe can be prevented. The engaging portion 43 may be formed only at the first frame 10, as counted from the closed end E2, or formed at third or following frames 10 as counted from the closed end E2. That is, the engaging portion 43 needs only to be placed at such a position that contact between the distal end portion 45a of the discharge pipe 45 and the closed end E2 can be prevented. In addition, even in cases where an engaging portion equivalent to the engaging portion 43 is formed at the anode separator 20 and the cathode separator 30, the engaging portion needs only to be placed at such a position that the contact between the distal end portion 45a of the discharge pipe 45 and the closed end E2 can be prevented.

(4) Fourth Modification

The first and second embodiments have been described with use of the support mechanism 400 formed integrally with the frame 10. Instead, after the discharge pipe 45 is preparatorily inserted into the support mechanism having the engaging portion at such a position that contact between the distal end portion 45a of the discharge pipe 45 and the closed end E2 can be prevented, the support mechanism may be placed at the anode offgas discharge manifold AMe along with the discharge pipe 45. In this case also, contact between the distal end portion 45a of the discharge pipe 45 and the closed end E2 can be prevented by the engaging portion 43 during the insertion of the discharge pipe 45 and the operation of the fuel cell FC, allowing residing water to be smoothly discharged out of the fuel cell FC via the discharge pipe 45.

Whereas the present disclosure has been described hereinabove based on embodiments and modifications thereof, the above embodiments of the disclosure are given for an easier understanding of the disclosure and not for limitations of the disclosure in any sense. The disclosure may be subjected to various changes and modifications and include various equivalents to the disclosure unless those changes and modifications as well as equivalents depart from the gist of the disclosure and the scope of its appended claims. For example, technical features in the embodiments and modifications corresponding to technical features in the individual aspects described in the section of SUMMARY may be replaced or combined with one another, as required, in order to solve part or entirety of the above-described problems or to achieve part or entirety of the above-described advantageous effects. Moreover, those technical features may be deleted, as required, unless herein otherwise described as indispensable.

What is claimed is:

1. A fuel cell comprising:
    a discharge manifold configured to discharge reaction offgas or coolant from inside of the fuel cell to outside of the fuel cell, the discharge manifold having an open end and a closed end;
    a discharge pipe placed within the discharge manifold, the discharge pipe having a first opening at a first end portion located on one side closer to the open end and a second opening at a second end portion located on another side closer to the closed end, wherein the discharge pipe is impermeable forming a fluid conduit between the first opening and the second opening; and
    a support mechanism configured to support the discharge pipe within the discharge manifold, the support mechanism including one or plural supporting portions configured to support the discharge pipe, an engaging portion configured to place the second end portion at a position apart from the closed end of the discharge manifold, and a retaining portion configured to retain the discharge pipe.

2. The fuel cell in accordance with claim 1, wherein
    the discharge manifold is a gas discharge manifold configured to discharge the reaction offgas, and
    the discharge pipe and the support mechanism are provided so as to be located at a vertically lower side in the discharge manifold when the fuel cell is mounted in position.

3. The fuel cell in accordance with claim 2, wherein
    the retaining portion is placed on one side closer to the open end while the supporting portion is placed between the retaining portion and the engaging portion.

4. The fuel cell in accordance with claim 1, wherein
    the discharge manifold is a liquid discharge manifold configured to discharge the coolant, and
    the discharge pipe and the support mechanism are provided so as to be located at a vertically upper side in the discharge manifold when the fuel cell is mounted in position.

5. The fuel cell in accordance with claim 4, wherein
    the retaining portion is placed on one side closer to the open end while the supporting portion is placed between the retaining portion and the engaging portion.

6. The fuel cell in accordance with claim 1, wherein the retaining portion is placed on one side closer to the open end while the supporting portion is placed between the retaining portion and the engaging portion.

7. The fuel cell in accordance with claim 1, wherein
    the fuel cell is formed by stacking a plurality of unit cells, each of the unit cells including a pair of separators and a frame placed between the pair of separators and retaining an electrolyte membrane;
    the pair of separators and the frame are provided with discharge manifold formation ports, respectively, to form the discharge manifold at stacked condition; and
    the support mechanism is formed at the discharge manifold formation port that the frame has.

8. The fuel cell in accordance with claim 7, wherein
    the support mechanism is further formed in at least either one of the discharge manifold formation ports provided in the pair of separators.

* * * * *